United States Patent
Wada et al.

(10) Patent No.: US 8,633,941 B2
(45) Date of Patent: Jan. 21, 2014

(54) IMAGE-PROCESSING APPARATUS, METHOD FOR CONTROLLING THEREOF, AND COMPUTER PROGRAM

(75) Inventors: Asuka Wada, Kawasaki (JP); Toru Nomakuchi, Abiko (JP); Satoru Mamiya, Yokohama (JP); Jun Fujisawa, Tokyo (JP); Shinya Takeichi, Tokyo (JP); Shuichi Okamura, Kawasaki (JP); Atsushi Date, Tokyo (JP); Takeshi Suzuki, Tachikawa (JP); Akihiro Takamura, Fuchu (JP); Waki Murakami, Tokyo (JP); Shigeru Sakamoto, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 12/430,789

(22) Filed: Apr. 27, 2009

(65) Prior Publication Data

US 2009/0296117 A1  Dec. 3, 2009

(30) Foreign Application Priority Data

May 28, 2008  (JP) ................................ 2008-140032

(51) Int. Cl.
*G09G 5/02*  (2006.01)
*G09G 5/00*  (2006.01)
(52) U.S. Cl.
USPC ............................ 345/589; 345/592; 345/629
(58) Field of Classification Search
USPC ......................................... 345/589, 592, 629
See application file for complete search history.

(56) References Cited

U.S. PATENT DOCUMENTS

| | | | |
|---|---|---|---|
| 6,169,552 B1 * | 1/2001 | Endo et al. ..................... | 345/427 |
| 6,342,882 B1 | 1/2002 | Oka | |
| 6,434,266 B1 | 8/2002 | Kanno et al. | |
| 6,888,577 B2 | 5/2005 | Waki et al. | |
| 6,900,817 B2 * | 5/2005 | Uesugi .......................... | 345/619 |
| 7,373,016 B2 | 5/2008 | Iyama | |
| 7,403,209 B2 * | 7/2008 | Liao et al. ..................... | 345/629 |
| 2002/0101435 A1 * | 8/2002 | Sasaki et al. .................. | 345/611 |
| 2004/0194020 A1 * | 9/2004 | Beda et al. .................... | 715/502 |
| 2005/0062754 A1 * | 3/2005 | Ku et al. ........................ | 345/592 |
| 2005/0168473 A1 * | 8/2005 | Nishi ............................. | 345/562 |
| 2005/0219585 A1 | 10/2005 | Suzuki et al. | |

(Continued)

FOREIGN PATENT DOCUMENTS

| | | |
|---|---|---|
| JP | 6-335022 | 12/1994 |
| JP | 7-72850 | 3/1995 |

(Continued)

*Primary Examiner* — David T Welch
(74) *Attorney, Agent, or Firm* — Fitzpatrick, Cella, Harper & Scinto

(57) ABSTRACT

An image-processing apparatus is provided. The apparatus includes a determining unit determining a type of image data; a holding unit holding color value for the still images, and holding a ratio for the moving image for each moving image, an updating unit updating the color value and the ratio, and a display unit displaying composite image data. For each piece of image data to be drawn, the updating unit updates each ratio based on a transmittance of the image data, updates the color value and a transmittance of a still image when it is a still image, and updates the color value data based on a transmittance of a moving image, and causes the transmittance to be further held as a ratio of the moving image when it is a moving image. The display unit displays the composite image data using the color value and the ratio.

5 Claims, 11 Drawing Sheets

(56) References Cited

U.S. PATENT DOCUMENTS

| | | |
|---|---|---|
| 2005/0219586 A1 | 10/2005 | Suzuki et al. |
| 2006/0072041 A1 | 4/2006 | Kii |
| 2006/0095200 A1* | 5/2006 | Ebi et al. ............ 701/200 |
| 2007/0005795 A1* | 1/2007 | Gonzalez ............ 709/232 |
| 2007/0053013 A1* | 3/2007 | Takahashi ............ 358/474 |
| 2007/0053023 A1 | 3/2007 | Suzuki et al. |
| 2007/0195107 A1* | 8/2007 | DuBois et al. ............ 345/589 |
| 2007/0200868 A1* | 8/2007 | Naito et al. ............ 345/592 |
| 2008/0123164 A1 | 5/2008 | Suzuki |
| 2008/0158425 A1* | 7/2008 | Kimura ............ 348/586 |
| 2009/0021513 A1* | 1/2009 | Joshi et al. ............ 345/419 |
| 2009/0249393 A1* | 10/2009 | Shelton et al. ............ 725/39 |

FOREIGN PATENT DOCUMENTS

| | | |
|---|---|---|
| JP | 11-102179 A | 4/1999 |
| JP | 2001-285745 | 10/2001 |
| JP | 2001-285749 A | 10/2001 |
| JP | 2002-051318 A | 2/2002 |
| JP | 2004-023332 A | 1/2004 |
| JP | 2006-106989 | 4/2006 |

* cited by examiner

FIG. 4

| IMAGE DATA | START POINT | END POINT | TRANSMITTANCE | Z ORDER |
|---|---|---|---|---|
| STILL IMAGE 301 | (0,0) | (1919,1079) | 1.0 | 0 |
| STILL IMAGE 302 | (400,150) | (1859,1029) | 1.0 | 1 |
| MOVING IMAGE 303 | (450,300) | (1649,974) | 1.0 | 2 |
| STILL IMAGE 304 | (50,50) | (729,839) | 0.8 | 3 |

| COMPOSITE COORDINATES 801 || MOVING IMAGE SUPERIMPOSITION RATIO Xi 802 |
|---|---|---|
| X-COORDINATE | Y-COORDINATE | |
| 0 | 0 | 0 |
| ⋮ | ⋮ | ⋮ |
| 450 | 299 | 0 |
| 450 | 300 | 0.2 |
| ⋮ | ⋮ | ⋮ |
| 729 | 839 | 0.2 |
| 729 | 840 | 1.0 |
| ⋮ | ⋮ | ⋮ |
| 1649 | 974 | 1.0 |
| 1649 | 975 | 0 |
| ⋮ | ⋮ | ⋮ |
| 1919 | 1079 | 0 |

| COMPOSITE COORDINATES | MOVING IMAGE SUPERIMPOSITION RATIO X |
|---|---|
| (450, 300) ~ (729, 839) | 0.2 |
| (450, 840) ~ (729, 974)<br><br>(730, 300) ~ (1649, 974) | 1.0 |

901 · 902

IMAGE-PROCESSING APPARATUS, METHOD FOR CONTROLLING THEREOF, AND COMPUTER PROGRAM

BACKGROUND OF THE INVENTION

1. Field of the Invention

The present invention relates to an image-processing technique that outputs composite image data obtained by composing two or more pieces of image data, and particularly relates to an image-processing technique that displays image data so as to be translucently superimposed.

2. Description of the Related Art

Recently, displays that receive television broadcasts have become multi-functional. In order to perform various settings, for example, a menu screen containing still images is displayed on a display screen. Control that assists setting operations while changing the menu screen according to user operations from a display controller or a remote control is often performed. Furthermore, as the size of a display increases and television broadcast waves are digitalized, a plurality of different moving images, typical examples of which include television reception images, are simultaneously displayed on one display screen.

When a plurality of still images and moving images are simultaneously displayed on one display screen in this manner, display areas of the plurality of images may conflict with each other. That is to say, since the images are layered in the depth direction (hereinafter, referred to as a "Z direction") on the display screen, the display areas of the images may be superimposed on each other. As a display method used in the case where display areas are superimposed on each other in this manner, there is a known method that gives a sense that an image is seen through another image. A method for composing pieces of image data in order to realize this sort of display method is referred to as alpha blending. When two or more pieces of image data are composed at a prescribed composite ratio, a plurality of images can be displayed so as to be superimposed at the degree of transmittance according to the composite ratio.

In alpha blending, a transmittance a indicating the degree of transparency at the time of composition is given to image data a that is displayed so as to be superimposed on another image. In a case where the image data a is composed with image data b displayed as the background, for example, translucent drawing is realized using Formulae 101 to 103 below for the color value data (R, G, B) of each pixel.

$$R = R(a) \cdot \alpha + R(b) \cdot (1-\alpha) \quad (101)$$

$$G = G(a) \cdot \alpha + G(b) \cdot (1-\alpha) \quad (102)$$

$$B = B(a) \cdot \alpha + B(b) \cdot (1-\alpha) \quad (103)$$

Where R refers to a color value of red, G refers to a color value of green, and B refers to a color value of blue. A color value is expressed in, for example, 8 bits, and may be an integer of 0 or more and 255 or less. Furthermore, (R(a), G(a), B(a)) is the color value data of the image data a. (R(b), G(b), B(b)) is the color value data of the background image data b. Each piece of color value data is obtained by subjecting image data to rendering.

Furthermore, the transmittance $\alpha$ is any value within the range of $0 \leq \alpha \leq 1$, wherein the data of an image that is superimposed on another image is completely transparent if $\alpha=0$, and data of an image that is superimposed on another image is completely opaque if $\alpha=1$.

Various methods have been already proposed for image composition using this alpha blending (Japanese Patent Laid-Open Nos. 2001-285745 and 2006-106989).

Furthermore, in the case where three or more pieces of image data are composed, Formulae 101 to 103 are repeatedly used to calculate the color value data of each pixel. That is to say, image data is sequentially taken as $I_0$, $I_1$, $I_2$ ... from the image data disposed rearmost in the Z direction of the display. First, the image data $I_0$ is taken as background image data b and the image data $I_1$ is taken as image data a that is superimposed thereon, to be used in Formulae 101 to 103 as above. Then, image data having the calculated color value data is taken as new background image b and the image data $I_2$ is taken as image data a that is superimposed thereon, to be used in Formulae 101 to 103.

Following the above-described procedure, in the case where three or more pieces of image data are composed, composition is successively performed in the arranged order in the Z direction of the display (hereinafter, referred to as a "Z order"). Accordingly, until composition of a series of pieces of image data arranged as the background of given image data completely ends, the image data cannot be composed. Such rendering that calculates color value data based on image data requires a certain amount of time. Accordingly, the time necessary to obtain one composite image includes the time that is obtained by simply adding the time for rendering the number of still images that are superimposed and the time for rendering the number of moving images that are superimposed. As a result, there is a problem in that the frame rate is lowered.

Techniques for solving the above-described problem are also proposed. In the technique disclosed in Japanese Patent Laid-Open No. H06-335022, output by a still image-creating unit that processes a drawing command and output by a video data-creating unit that outputs video data are switched and output based on transmittance data contained in the drawing command. Accordingly, composition can be performed at a high speed. Furthermore, in the technique disclosed in Japanese Patent Laid-Open No. H07-072850, a frame buffer for moving images and a frame buffer for still images are completely separated, and images are superimposed by the control of a window system.

However, the above-described techniques are problematic in that they need a memory area for holding the color value data of each pixel for all pieces of image data that are to be superimposed.

Furthermore, in order to reduce memory usage, a technique is conceivable in which the rendering results of still images are superimposed in a common memory area and output. In this technique, the only memory area necessary to obtain superimposition results for a plurality of pieces of still image data after rendering is just the area necessary for one piece of image data. However, for example, in the alpha blending of a group consisting of a series of pieces of image data in which still images and moving images are arranged so as to be alternately superimposed, the Z order and the image data composite order do not match. Accordingly, correct composite image data cannot be obtained.

SUMMARY OF THE INVENTION

An aspect of the present invention relates to an image-processing apparatus that composes a plurality of pieces of image data into a single piece of image data, the apparatus being capable of corresponding to a change in moving images and realizing complete alpha blending at a relatively high speed and low cost.

According to one aspect of the present invention, there is provided an image-processing apparatus that composes pieces of image data that are respectively drawn based on a plurality of drawing commands and displays the composite image data, comprising: an acquiring unit configured to acquire individual drawing commands in a predetermined order from the plurality of drawing commands; a determining unit configured to determine whether or not image data that is drawn based on the drawing command is a still image or a moving image, the moving image including a plurality of frames; a holding unit configured to hold color value data used for displaying a composite result of the still images, and to hold a moving image superimposition ratio used for displaying the moving image for each moving image; an updating unit configured to update the color value data and the moving image superimposition ratio held by the holding unit; and a display unit configured to display color value data representing composite image data, on a display screen; wherein, for each piece of image data that is drawn based on the drawing command in the predetermined order, the updating unit: updates each moving image superimposition ratio held in the holding unit based on a transmittance of the image data; updates the color value data held by the holding unit based on color value data and a transmittance of a still image in a case where the image data is determined to be a still image; and updates the color value data held by the holding unit based on a transmittance of a moving image, and causes the transmittance to be further held by the holding unit as a moving image superimposition ratio of the moving image in a case where the image data is determined to be a moving image; and the display unit: displays the color value data held by the holding unit; and adds color value data, calculated by multiplying the color value data for each frame in the moving image by the moving image superimposition ratio corresponding to the moving image held by the holding unit, to color value data that is currently displayed, and displays resulting data on the display screen.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a parameter table 400 of each piece of image data constituting composite image data 300.

FIG. 8 is a diagram illustrating a configuration example of a moving image superimposition ratio table 121 in an embodiment of the present invention.

FIG. 9 is a diagram illustrating another configuration example of the moving image superimposition ratio table 121 in an embodiment of the present invention.

DESCRIPTION OF THE EMBODIMENTS

Hereinafter, exemplary embodiments of the present invention will be described with reference to the accompanying drawings.

First Exemplary Embodiment

Figure 1:
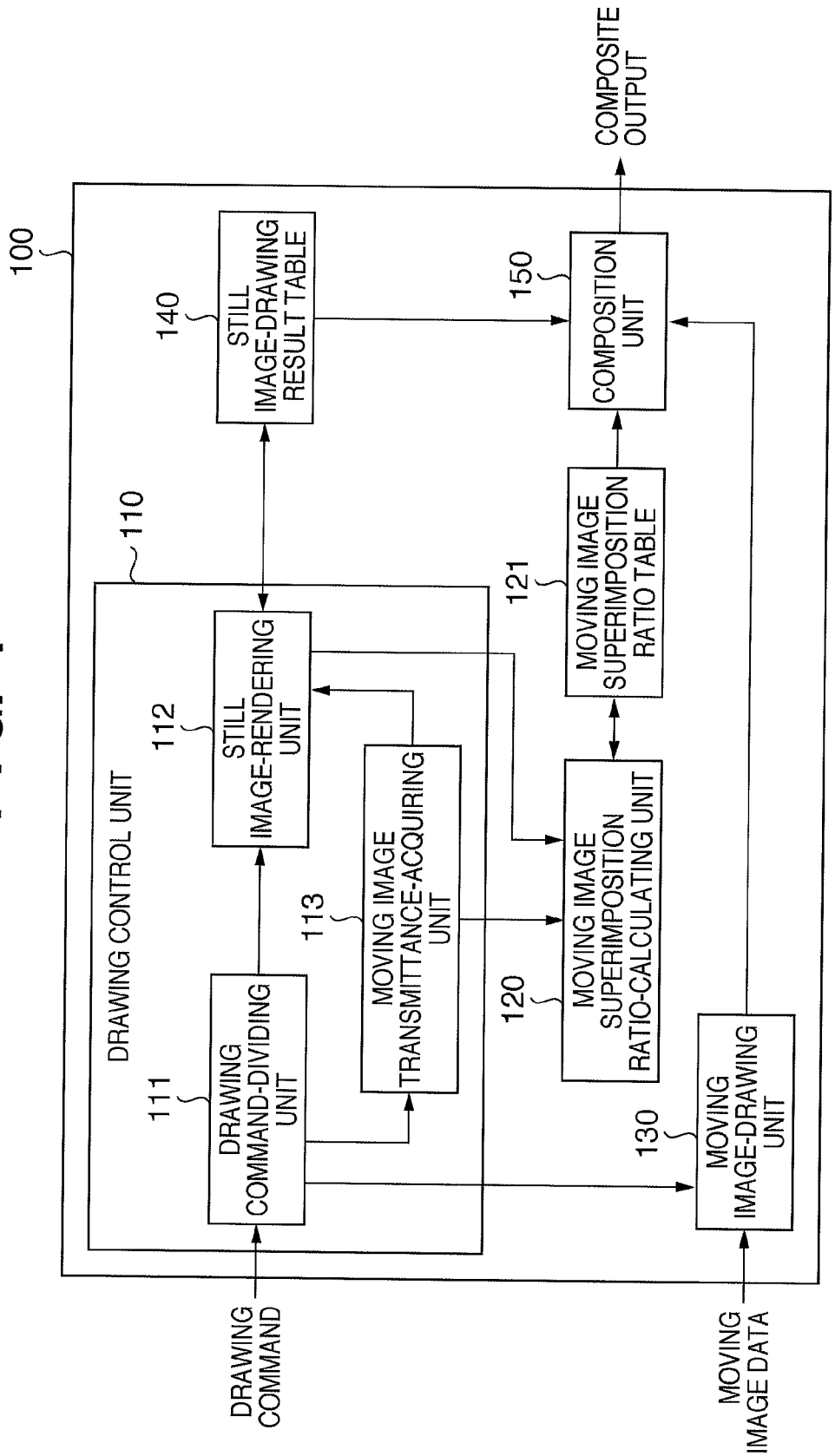
FIG. 1 is a block diagram illustrating an example of the configuration of an image-processing apparatus 100 in an embodiment of the present invention.

FIG. 1 is a block diagram illustrating an example of the configuration of an image-processing apparatus 100 in this embodiment.

The image-processing apparatus 100 includes a drawing control unit 110, a moving image superimposition ratio-calculating unit 120, a moving image-drawing unit 130, and a composition unit 150.

The drawing control unit 110 includes a drawing command-dividing unit 111, a still image-rendering unit 112, and a moving image transmittance-acquiring unit 113. The drawing command-dividing unit 111 acquires a drawing command that contains a series of moving image-drawing commands and a series of still image-drawing commands, and divides the command into individual drawing commands. In the case where a target that is to be processed based on the drawing command is a still image, a request to perform processing is sent to the still image-rendering unit 112. In the case where a target that is to be processed based on the drawing command is a moving image, the drawing command-dividing unit 111 outputs the Z order, which is the order in which pieces of image data are superimposed, and the moving image-drawing command, to the moving image transmittance-acquiring unit 113 and the moving image-drawing unit 130. Here, the moving image superimposition ratio refers to a value that is to be multiplied by color value data of a moving image when the moving image is displayed so as to be superimposed on a still image in step S516, which will be described later.

The still image-rendering unit 112 renders the still image-drawing command received from the drawing command-dividing unit 111, and acquires the color value data and the transmittance of a still image. Based on this result, the still image-rendering unit 112 updates color value data held in a still image-drawing result table. Furthermore, the still image-rendering unit 112 outputs the transmittance to the moving image superimposition ratio-calculating unit 120. Furthermore, in the case where a transmittance a of a moving image is received from the moving image transmittance-acquiring unit 113, the still image-rendering unit 112 updates color value data held in the still image-drawing result table 140.

The moving image transmittance-acquiring unit 113 acquires a transmittance a of a moving image from the moving image-drawing command output by the drawing command-dividing unit 111, outputs the transmittance a and the Z order to the moving image superimposition ratio-calculating unit 120, and outputs the transmittance α to the still image-rendering unit 112.

The moving image superimposition ratio-calculating unit 120 updates a moving image superimposition ratio table 121, using the Z order and the moving image transmittance output by the moving image transmittance-acquiring unit 113.

The moving image-drawing unit 130 processes moving image data according to the moving image-drawing command output by the drawing command-dividing unit 111, and outputs the processed moving image and the Z order to the composition unit 150.

The composition unit 150 outputs the color value data of a still image held by the still image-drawing result table 140. Furthermore, the composition unit 150 multiplies the color value data of a moving image frame output by the moving image-drawing unit 130 by the moving image superimposition ratio acquired from the moving image superimposition ratio table 121 and outputs the result.

Figure 2:
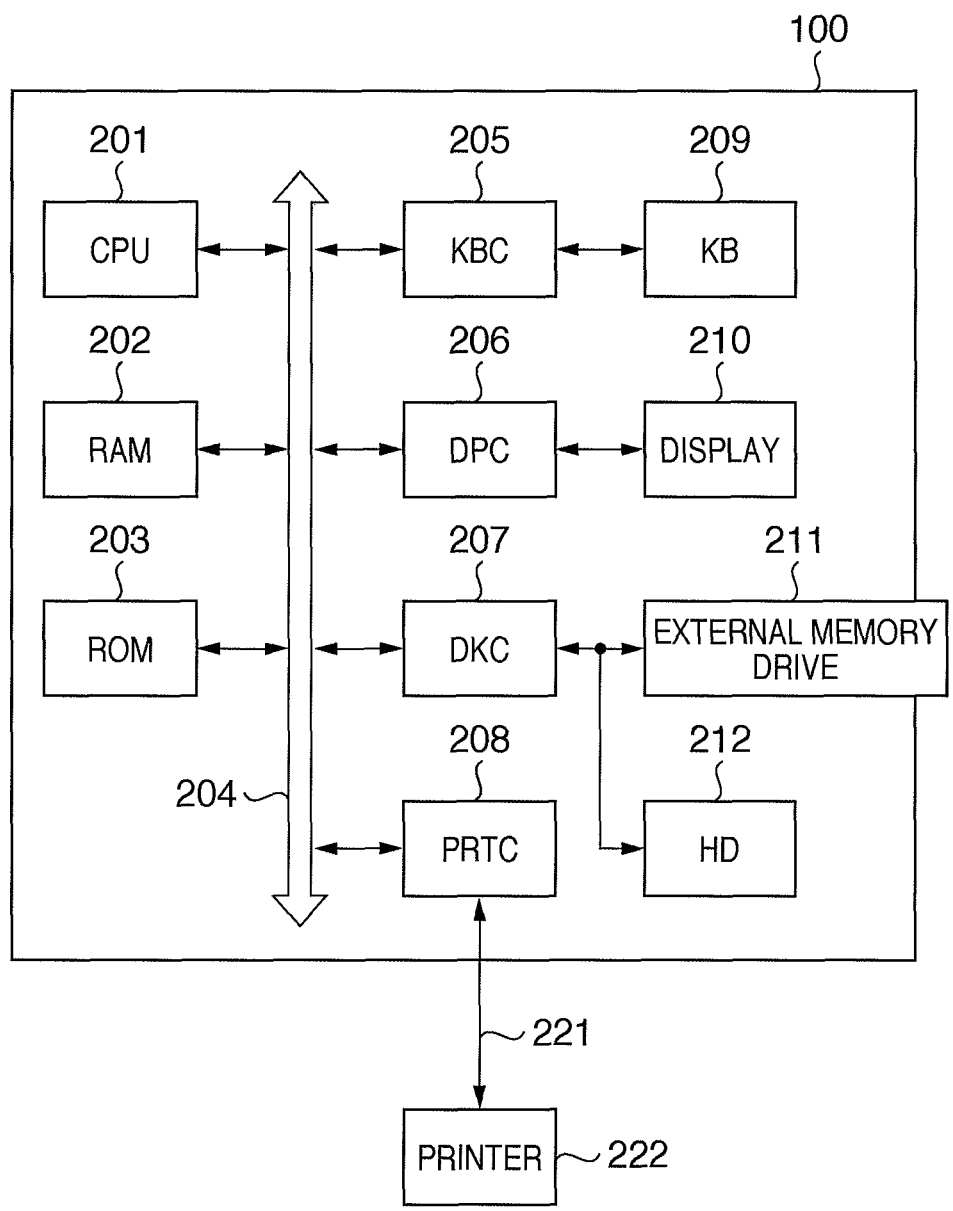
FIG. 2 is a block diagram showing an example of the hardware configuration of the image-processing apparatus 100 in an embodiment of the present invention.

FIG. 2 is a block diagram showing an example of the hardware configuration of the image-processing apparatus 100. Here, in FIG. 2, the minimum configuration for realizing the configuration of the image-processing apparatus 100 corresponding to the embodiment of the present invention is shown, and the other mechanisms relating to the image-processing apparatus 100 are omitted for the sake of the simplicity of the description.

A CPU 201 functioning as a microprocessor controls the image-processing apparatus 100, based on a program and data stored in a ROM 203, a hard disk (HD) 212, or a storage medium set in an external memory drive 211.

A RAM 202 functions as the work area of the CPU 201, and holds a program stored in the ROM 203, the HD 212, or the like. Furthermore, the RAM 202 holds the still image-drawing result table 140 and the moving image superimposition ratio table 121.

A program that is to be executed by the CPU 2-01 as shown in a flowchart described below is stored, for example, in the ROM 203, a storage medium set in the external memory drive 211, or the HD 212.

A keyboard controller (KBC) is denoted by 205 and controls input from a keyboard (KB) 209 or pointing device (not shown) such as a mouse. Further, a display controller (DPC) is denoted by 206 and controls the display of a display 210. The display 210 displays composite image data output by the composition unit 150. A disk controller (DKC) is denoted by 207 and controls access to the HD 212 and the external memory drive 211, and various types of data, such as various programs, font data, user files, and edition files, are read from and written to these storage media by the DKC. A printer controller (PRTC) is denoted by 208, and is connected via a predetermined two-way interface 221 to a printer 222 thereby controlling communication with the printer 222.

The CPU 201 develops (rasterizes) an outline font, for example, into display information in an area allocated on the RAM 202 or a dedicated video memory (VRAM), and enables data to be displayed on the display 210. Furthermore, the CPU 201 opens various registered windows and performs various data processes, based on a command given using, for example, a mouse cursor on the display 210.

Figure 3:
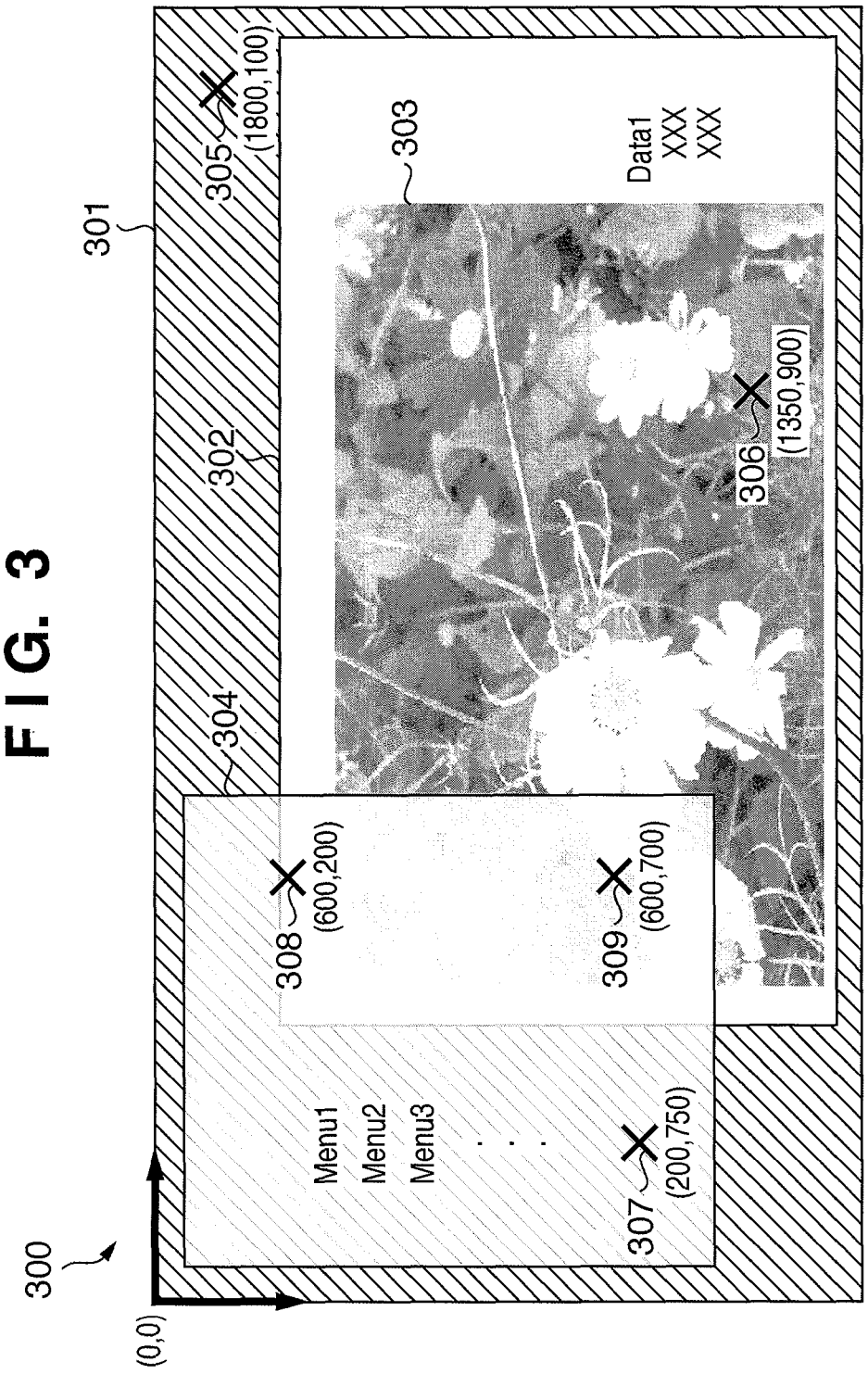
FIG. 3 is a view illustrating an example of the composite results for image data in an embodiment of the present invention.

Next, the composition of image data will be described with reference to FIG. 3. FIG. 3 is a view illustrating an example of the composite results for image data. Composite image data is output from the composition unit 150 to the display controller 206 and displayed on the display 210.

Composite image data 300 shown in FIG. 3 is obtained by composing still images 301, 302, and 304 and a moving image 303. The still image 301 is, for example, a background image displayed on the display screen across the display 210. The still image 302 and the moving image 303 are respectively, for example, a data broadcast screen and a television screen obtained by receiving digital broadcast waves. The still image 304 is, for example, a menu screen displayed according to user operations using a remote control or the like as an input interface.

It is assumed that the plurality of pieces of image data shown in FIG. 3 are displayed so that the pieces of image data 301, 302, 303, and 304 are arranged in this order from the background in the depth direction of the display 210, that is, in the Z direction. It is assumed that, regarding the Z order, pieces of image data are serially numbered, for example, from the background in the Z direction. In FIG. 3, the Z orders of the image data 301, 302, 303, and 304 are respectively taken as 0, 1, 2, and 3.

FIG. 4 is a parameter table 400 of each piece of image data shown in FIG. 3, and rows 401 to 404 respectively correspond to the image data 301 to 304. Columns 405 and 406 respectively show coordinates of the upper left and the lower right of a position at which the image data is displayed on the composite image. Here, as an example, the upper left of a composite image as shown in FIG. 3 is taken as a start point, the x-coordinate is set in the horizontal direction, and the y-coordinate is set in the vertical direction. In this coordinate system, the coordinates of the upper left in each piece of image data is taken as a start point, and the coordinates of the lower right is taken as an end point. A column 407 shows the transmittance of the image data. It is shown that the transmittance of the image data 301 to 303 is 1.0, that is, the images are completely opaque, and that the transmittance of the image 304 is 0.8, that is, an image positioned behind this image is seen through the image 304 at a ratio of 0.2. Here, the values shown in FIG. 4 are individually obtained through processing in the image-processing apparatus 100. For example, the transmittance of a still image is obtained by the still image-rendering unit 112 rendering a still image-drawing command. A column 408 shows the Z order, which is set to a value as described above.

In FIG. 3, the only image data containing a pixel 305 is image data 301. Accordingly, the color value data (R, G, B) of the pixel 305 is determined only by the color value data of the image data 301 at the pixel 305. The image data containing a pixel 306 is the image data 301, 302, and 303. However, the transmittance α of the image data 303 having the largest Z order among these images is 1. That is to say, the image data 303 is completely opaque, and, thus, the color value data of the pixel 306 is determined only by the color value data of the image data 303. On the other hand, the transmittance of the image data 304 is set to less than 1, and, thus, the color value data of the image data 304 and the color value data of image data positioned therebehind are composed at pixels 307, 308, and 309. The color value data is composed using Formulae 101 to 103.

Hereinafter, the composition of image data will be described with reference to Formulae 101 to 103 and Formulae 201 to 203. Formulae 101 to 103 are a set of examples of formulae for calculating color value data in a case where two pieces of image data are composed. It is assumed that image data b is displayed in a superimposed manner in front of image data a at a transmittance of α. In Formulae 101 to 103, (R, G, B) is the color value data of composite image data. (R(a), G(a), B(a)) and (R(b), G(b), B(b)) are respectively the color value data of the image data a and the image data b. As the transmittance α becomes larger, the influence of the color value data of the image data a positioned in the background increases, and as the transmittance α becomes smaller, the influence of the color value data of the image data b positioned on the front side increases. The color value data may be a different value for each pixel, and the transmittance also may be a different value for each pixel.

Formulae 201 to 203 below are a set of examples of formulae for calculating color value data in a case where a plurality of pieces of image data are composed.

$$R = R_N \alpha_N + \sum_{i=0}^{N-1} R_i \alpha_i \prod_{j=i+1}^{N} (1 - \alpha_j) \qquad (201)$$

$$G = G_N \alpha_N + \sum_{i=0}^{N-1} G_i \alpha_i \prod_{j=i+1}^{N} (1 - \alpha_j) \qquad (202)$$

$$B = B_N \alpha_N + \sum_{i=0}^{N-1} B_i \alpha_i \prod_{j=i+1}^{N} (1 - \alpha_j) \qquad (203)$$

Here, it is assumed that N+1 pieces of image data $I_0, \ldots, I_N$ (N is an integer of 1 or more) are composed, and the Z orders of the respective pieces of image data are $0, \ldots, N$. That is to say, it is assumed that $I_0$ is displayed on the rearmost side, and $I_N$ is displayed on the frontmost side. At that time, the color value data (R, G, B) of composite image data is given by Formulae 201 to 203. Here, $(R_k, G_k, B_k)$ and $\alpha_k$ are the color value data and the transmittance of image data $I_k$. Here, k is an integer of 0 or more and N or less. It is assumed that these definitions are applicable also to the numerical formulae below.

When a plurality of pieces of image data are composed, first, two pieces of image data having the smallest and second smallest Z order are selected, and the color value data is calculated using Formulae 101 to 103. For example, the image data $I_0$ and the image data $I_1$ are composed. The composite image data is composed with the image data $I_2$ having the next smallest Z order. This operation is repeated up to the image data $I_N$ having the largest Z order. As a result, the color value data (R, G, B) of the composite image data is as in Formulae 201 to 203.

At pixels not constituting the image data $I_k$, $\alpha_k$ is set to 0 for convenience. With this sort of definition, the color value data of a pixel at any position can be expressed by Formulae 201 to 203.

Next, the operation of the image-processing apparatus 100 in this embodiment will be described with reference to FIGS. 5 to 11.

Figure 5:
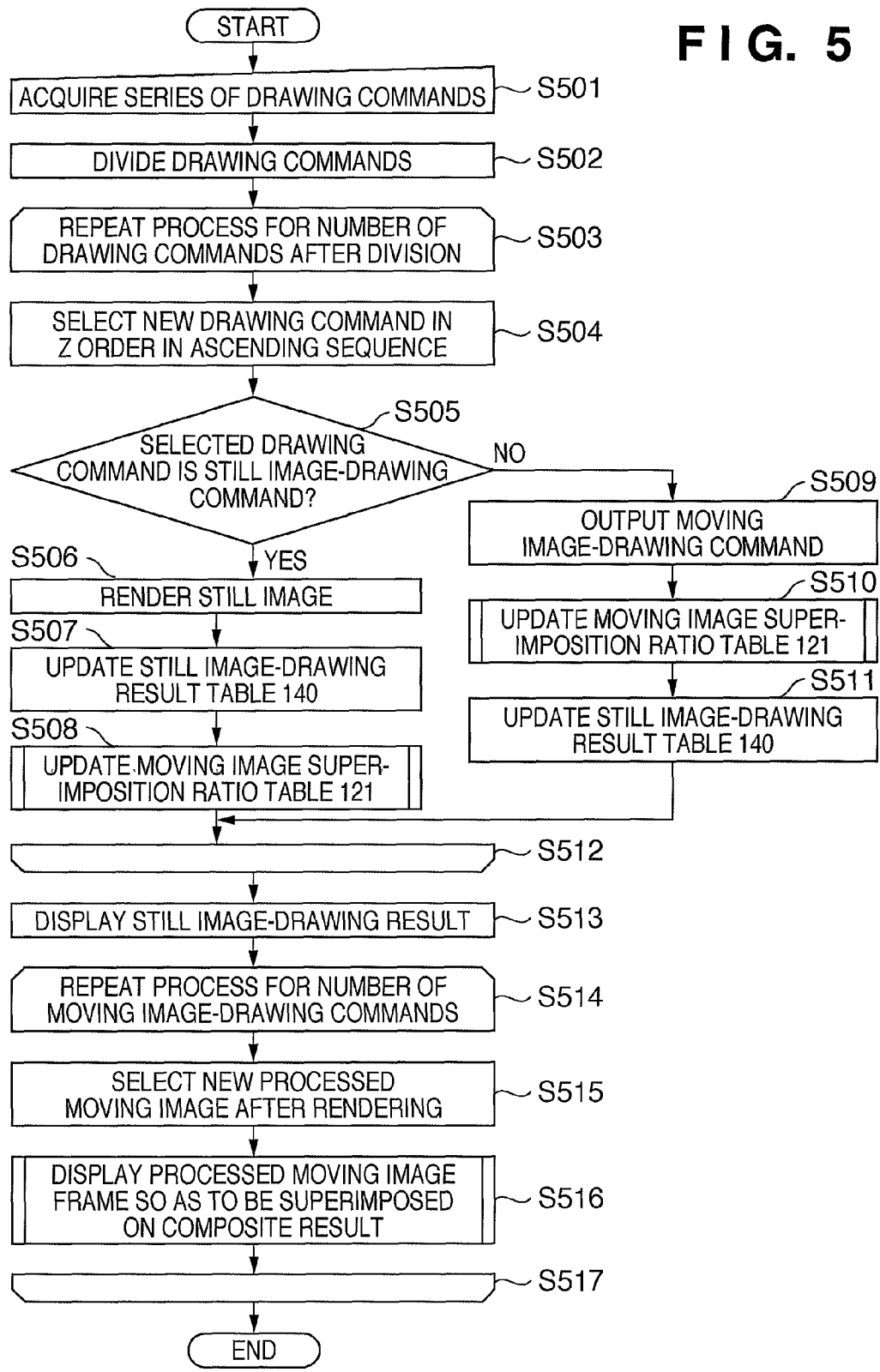
FIG. 5 is a flowchart illustrating an example of a drawing process of the image-processing apparatus in an embodiment of the present invention.

FIG. 5 is a flowchart illustrating an example of a drawing process of the image-processing apparatus in this embodiment. The process in this flowchart is performed by the CPU 201 executing a computer program written in the ROM 203.

In step S501, the drawing control unit 110 acquires a drawing command that contains a series of moving image-drawing commands and a series of still image-drawing commands. The moving image-drawing commands and still image-drawing commands may be a single command, or may be a plurality of commands.

In step S502, the drawing command-dividing unit 111 divides the acquired drawing command into individual moving image-drawing commands and individual still image-drawing commands.

The moving image-drawing command after the division contains an instruction to start rendering a moving image, the Z order, and a moving image-processing parameter group necessary for this process. Furthermore, the moving image-processing parameter group contains: moving image masking information; moving image source input path information on this moving image; size information; origin coordinate information; affine transformation parameters representing deformation, such as rotation, variable power, and movement; and color space information; and the like.

Furthermore, the still image-drawing command after the division contains an instruction to start rendering of a still image, drawing object information, and a still image-processing parameter group necessary for the drawing. Furthermore, the drawing object information contains, for example, text, basic figure, path information, link information, and animation instructions, and the like. Furthermore, the still image-processing parameter group contains, for example, origin coordinates, size, line width, line type, color information, and the like of an object.

The processes in steps S503 to S512 are repeated for the number of drawing commands after the division obtained in step S502. Since the composite image data 300 shown in FIG. 3 contains four pieces of composed image data, the number of repetitions is 4.

In step S504, the drawing control unit 110 selects one drawing command after the division having the smallest Z order, from among drawing commands that have not been selected yet in this step. Hereinafter, the drawing command that is selected is simply referred to as a "selected drawing command".

The Z order may be explicitly specified, or may not be explicitly specified. In the case where the Z order is explicitly specified, for example, the Z order is specified as one parameter for a series of drawing commands. Accordingly, it is possible to flexibly correspond to a change in the order in which images are to be superimposed. In the case where the Z order is not explicitly specified, for example, the Z orders are provided in the order in which drawing commands after the division are input. Accordingly, the Z order can be determined without inputting special parameters for the series of drawing commands acquired by the drawing control unit 110.

In the example shown in FIG. 3, the image data 301 is selected first, and the image data 302 is selected next.

In step S505, the drawing control unit 110 determines whether or not the selected drawing command is a still image-drawing command. If it is determined that the command is a still image-drawing command ("YES" in step S505), the procedure proceeds to step S506. If it is determined that the command is a moving image-drawing command ("NO" in step S505), the procedure proceeds to step S509. In the case where the composite image data 300 shown in FIG. 3 is to be displayed, if a drawing command to draw the image data 301, 302, and 304 is selected, the procedure proceeds to step S506. If a drawing command to draw the image data 303 is selected, the procedure proceeds to step S509.

For the still image-drawing command, the processes in steps S506 to S508 are performed.

In step S506, the still image-rendering unit 112 renders the still image-drawing command that is selected. Hereinafter, the still image-drawing command that is selected is simply referred to as a "selected still image-drawing command". As the results of the rendering, the drawing position, and the color value data and the transmittance for each pixel of a still image that is drawn based on the selected still image-drawing command are obtained.

In step S507, the still image-rendering unit 112 updates the still image-drawing result table 140.

Figure 6:
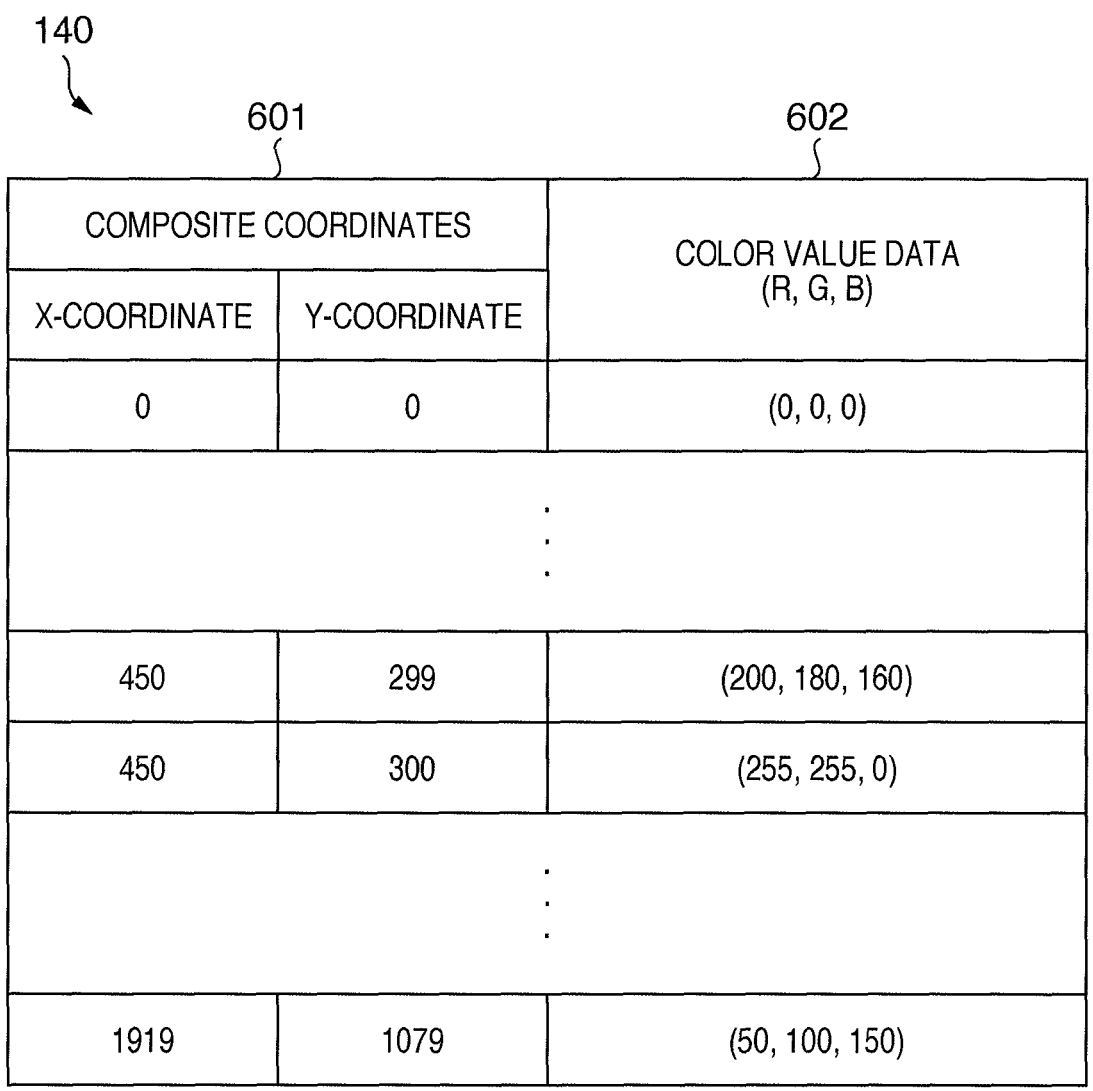
FIG. 6 is a diagram illustrating an example of the configuration of a still image-drawing result table 140 in an embodiment of the present invention.

Then, the still image-drawing result table 140 will be described with reference to FIG. 6. FIG. 6 is a diagram illustrating an example of the configuration of the still image-drawing result table 140. The column "composite coordinates 601" shows the coordinates of a pixel in composite image data. The column "color value data 602" shows color value data (R, G, B) for each pixel. The flowchart is configured so that the color value data 602 holds only the color value data based on still images.

The still image-drawing result table 140 is updated based on Formulae 101 to 103. Here, the color value data and the transmittance of the selected still image acquired in step S506 are used as (R(a), G(a), B(a)) and α. Furthermore, the color value data 602 held in the still image-drawing result table 140 is used as (R(b), G(b), B(b)). The color value data 602 of each pixel held in the still image-drawing result table 140 is initialized to 0.

The still image-drawing result table 140 is updated for each pixel on the composite image. At that time, it is sufficient that the color value data 602 is updated only for pixels of a still image that is drawn based on the selected still image-drawing command. Hereinafter, the image data that is drawn based on the selected still image-drawing command is simply referred to as a "selected still image".

Returning to FIG. 5, in step S508, the still image-rendering unit 112 outputs the transmittance of the selected still image to the moving image superimposition ratio-calculating unit 120. The moving image superimposition ratio-calculating unit 120 uses this transmittance to update the moving image superimposition ratio table 121. The update of the moving image superimposition ratio table 121 will be described later in detail. Here, the processes in steps S507 and S508 can be performed in the opposite order. Also in this case, the same result can be obtained from this flowchart.

For the moving image-drawing command, the processes in steps S509 to S511 are performed.

In step S509, the drawing command-dividing unit 111 outputs the moving image-drawing command and the Z order to the moving image-drawing unit 130 and the moving image transmittance-acquiring unit 113. The moving image-drawing unit 130 processes the moving image data based on the acquired moving image-drawing command and Z order, and outputs the processed moving image data together with the Z order to the composition unit 150. The processed moving image data contains the color value data for display.

In step S510, the moving image transmittance-acquiring unit 113 acquires the transmittance from the moving image-drawing command that is selected, and outputs the transmittance to the moving image superimposition ratio-calculating unit 120. Hereinafter, the moving image-drawing command that is selected is simply referred to as a "selected moving image-drawing command", and the moving image that is drawn based on the selected moving image-drawing command is simply referred to as a "selected moving image". The moving image superimposition ratio-calculating unit 120 uses the received transmittance to update the moving image superimposition ratio table 121. The update of the moving image superimposition ratio table 121 will be described later in detail.

In step S511, the moving image transmittance-acquiring unit 113 outputs the transmittance α of the selected moving image to the still image-rendering unit 112. The still image-rendering unit 112 updates the still image-drawing result table 140 based on Formulae 101 to 103, as in the process in step S507 described above. Note that the formulae are used by setting the color value data of the selected moving image to R=G=B=0. The reason for this is to allow the color value data 602 of the still image-drawing result table 140 to hold only the color value data 602 based on still images.

With the above-described process, the loop consisting of steps S503 to S512 ends. At the end point of this loop, the color value data 602 of the still image-drawing result table 140 holds the color value data ($R_G$, $G_G$, $B_G$) defined by the following formulae.

$$R_G = R_N \alpha_N + \sum_{i=0}^{N-1} R_i \alpha_i \prod_{j=i+1}^{N} (1 - \alpha_j) \quad (301)$$

$$G_G = G_N \alpha_N + \sum_{i=0}^{N-1} G_i \alpha_i \prod_{j=i+1}^{N} (1 - \alpha_j) \quad (302)$$

$$B_G = B_N \alpha_N + \sum_{i=0}^{N-1} B_i \alpha_i \prod_{j=i+1}^{N} (1 - \alpha_j) \quad (303)$$

Where, if the image data $I_k$ is a moving image, $R_G = G_K = B_G = 0$.

Formulae 301 to 303 above are numerical formulae illustrating an example of the color value data held in the still image-drawing result table 140. The color value data ($R_G$, $G_G$, $B_G$) has the same values as obtained by extracting the color value data only based on still images, in the color value data in the case where N+1 pieces of image data are composed as shown in Formulae 201 to 203. The reason for this is that, in step S511, all of the color value data of the selected moving image is set to 0.

Figure 7:
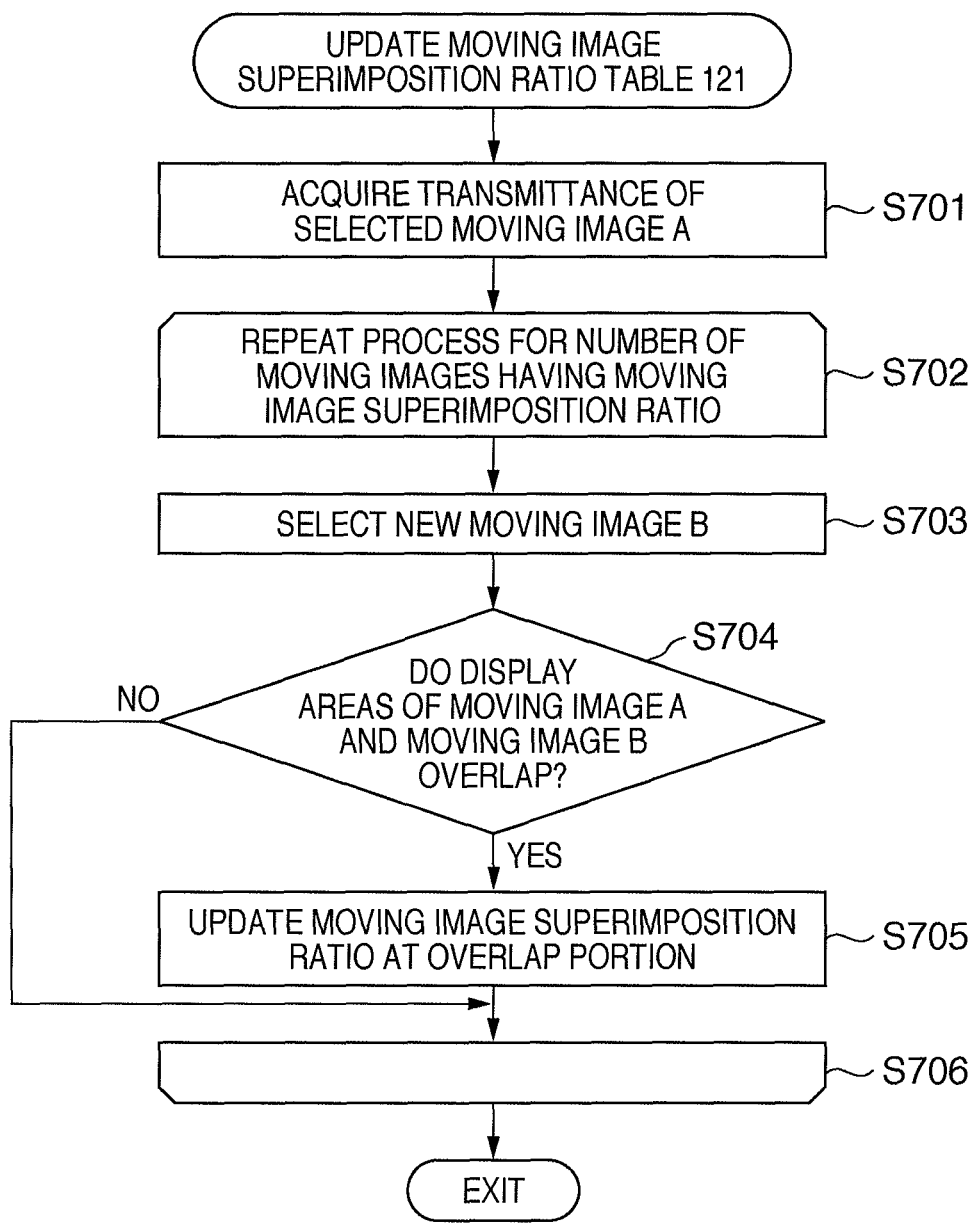
FIG. 7 is a flowchart illustrating an example of a process that updates the moving image superimposition ratio when processing a moving image-drawing command in an embodiment of the present invention.

Next, step S510 shown in FIG. 5 will be described in detail with reference to FIG. 7. FIG. 7 is a flowchart illustrating an example of a process that updates the moving image superimposition ratio when processing a moving image-drawing command. The process in this flowchart is performed by the CPU 201 executing a computer program written in the ROM 203.

In step S701, the moving image transmittance-acquiring unit 113 acquires the transmittance from the selected moving image-drawing command, and adds an entry column corresponding to the selected moving image, to the moving image superimposition ratio table 121. The moving image transmittance-acquiring unit 113 sets the moving image superimposition ratio of a pixel contained in the selected moving image, to the acquired transmittance. On the other hand, the moving image transmittance-acquiring unit 113 sets the moving image superimposition ratio of a pixel not contained in the selected moving image to 0.

A configuration example of the moving image superimposition ratio table 121 will be described with reference to FIGS. 8 and 9.

FIG. 8 is a diagram illustrating a configuration example of the moving image superimposition ratio table 121. The column "composite coordinates 801" shows the position of a pixel in the composite coordinate system. The column "moving image superimposition ratio 802" shows the moving image superimposition ratio for each pixel. In the moving image superimposition ratio 802, an entry column is created for each moving image that is composed. In the configuration example of the moving image superimposition ratio table 121 shown in FIG. 8, the moving image superimposition ratio is held for each pixel. Accordingly, this configuration may be used in the case where the number of pieces of image data that are to be composed is large and the transmittance of each piece of image data is set in detail.

FIG. 9 is a diagram illustrating another configuration example of the moving image superimposition ratio table 121. The column "composite coordinates 901" shows the areas in the composite coordinate system. The column "moving image superimposition ratio 902" shows the moving image superimposition ratio of a pixel contained in each area. The content represented in FIG. 9 is the same as that in FIG. 8. In the configuration example of the moving image superimposition ratio table 121 shown in FIG. 9, the-moving image superimposition ratio is held collectively for a given area. Accordingly, this configuration may be used in a case where the capacity of the RAM 202 necessary to hold the moving image superimposition ratio is small and an image-drawing command of a relatively simple composite pattern is to be processed.

Returning to FIG. 7, in step S701, the process that acquires the transmittance from the selected moving image-drawing command is performed as follows. The moving image transmittance-acquiring unit 113 separates a moving image mask-creating command from the received moving image-drawing command, and executes the command thereby acquiring the transmittance. Here, in a case where the moving image mask-creating command that is separated contains calculated moving image masking information so as to match the output area of the moving image, the moving image transmittance-acquiring unit 113 executes the command thereby acquiring the transmittance. Furthermore, in a case where the moving image mask-creating command that is separated contains moving image transmittance information that gives a given transmittance to the moving image, the moving image transmittance-acquiring unit 113 calculates the moving image transmittance information so as to match the output area of the moving image, and acquires the transmittance. Furthermore, in the case where the moving image mask-creating command that is separated contains a command group consisting of a series of moving image mask-creating commands for creating a moving image mask, the moving image transmittance-acquiring unit 113 executes the command group thereby acquiring the transmittance. Furthermore, in the case where the moving image-drawing command received by the moving image transmittance-acquiring unit 113 from the drawing command-dividing unit 111 does not contain the moving image masking information, the moving image transmittance information, or the command group consisting of the moving image mask-creating commands, the moving image transmittance-acquiring unit 113 calculates the transmittance of the moving image to 1.

Next, the processes in steps S702 to S706 are repeated for the number of moving images having a smaller Z order than that of the selected moving image-drawing command.

In step S703, one new moving image is selected from among the moving images having a smaller Z order than that of the moving image that is drawn based on the selected moving image-drawing command. This moving image is taken as a selected moving image B, and the moving image that is drawn based on the moving image-drawing command selected in step S504 is taken as a selected moving image A.

In step S704, whether or not the selected moving image A and the selected moving image B share a pixel is determined. If the images share a pixel, the procedure proceeds to step S704. If the images do not share a pixel, the procedure proceeds to step S706.

In step S705, the moving image superimposition ratio in the entry column of the selected moving image B, at a pixel shared by the selected moving image A and the selected moving image B, is multiplied by 1−α. Here, α is the transmittance of the selected moving image A.

When the processes in steps S702 to S706 are repeated, the moving image superimposition ratio for each pixel of each moving image is updated.

Figure 10:
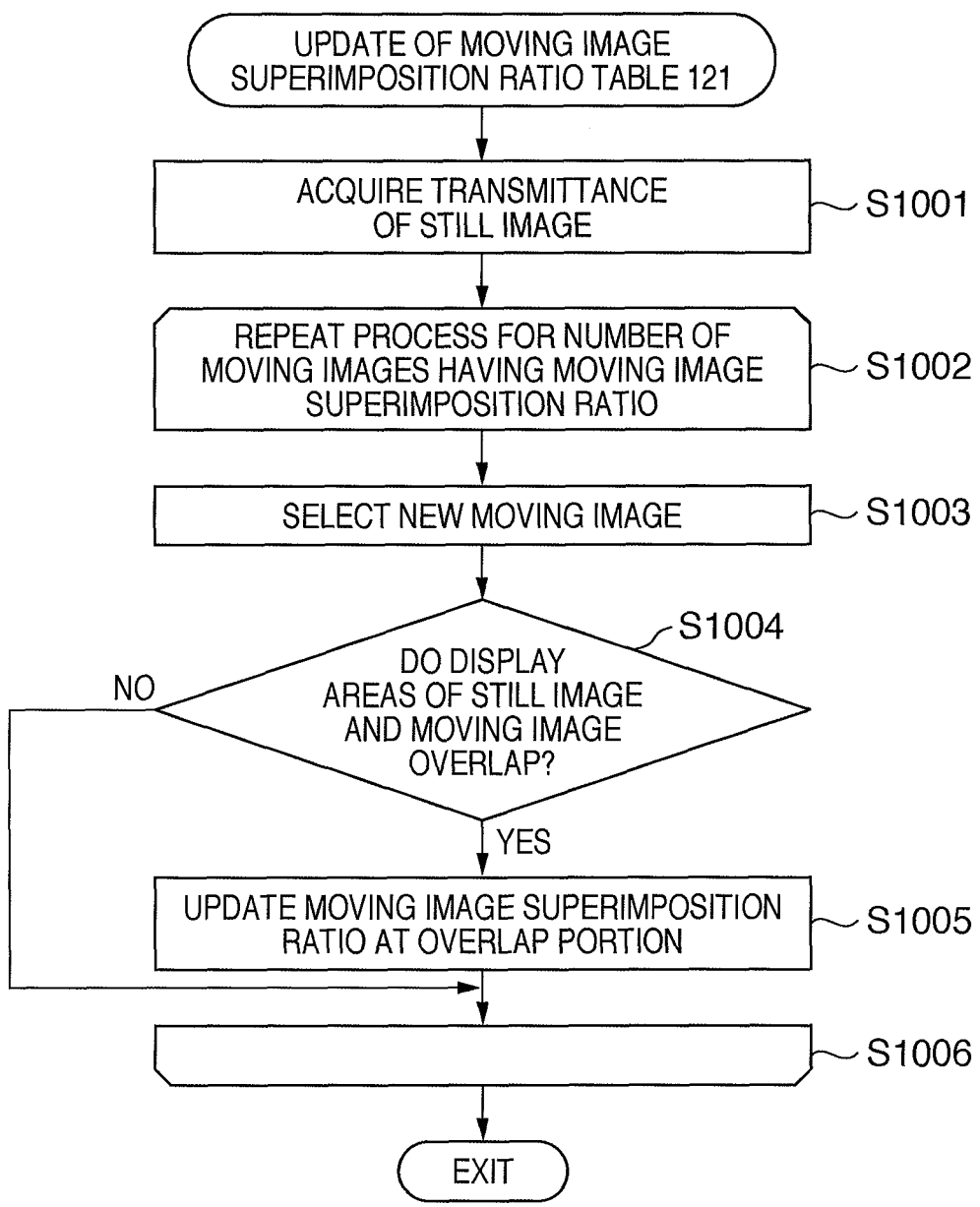
FIG. 10 is a flowchart illustrating an example of a process that updates the moving image superimposition ratio table 121 when processing a still image-drawing command in an embodiment of the present invention.

Next, step S508 shown in FIG. 5 will be described in detail with reference to FIG. 10. FIG. 10 is a flowchart illustrating an example of a process that updates the moving image superimposition ratio table 121 when processing a still image-drawing command. The process in this flowchart is performed by the CPU 201 executing a computer program written in the ROM 203.

In step S1001, the moving image superimposition ratio-calculating unit 120 acquires the transmittance of the selected still image-drawing command from the still image-rendering unit 112.

The processes in steps S1002 to S1006 are repeated for the number of the moving images having a smaller Z order than that of the selected still image-drawing command.

In step S1003, the moving image superimposition ratio-calculating unit 120 selects one moving image that has not been selected yet in this step, from among the moving images having a smaller Z order than that of the selected still image-drawing command.

In step S1004, the moving image superimposition ratio-calculating unit 120 determines whether or not the selected still image and the selected moving image share a pixel. If the images share a pixel, the procedure proceeds to step S1005, and, if the images do not share a pixel, the procedure proceeds to step S1006.

In step S1005, the moving image superimposition ratio-calculating unit 120 multiplies, by 1−α, the moving image superimposition ratio in the entry column of the selected moving image, at a pixel shared by the selected still image and the selected moving image. Here, α is the transmittance of the selected still image.

With the above-described process, at the end point of the loop consisting of steps S503 to S512, the moving image superimposition ratio shown below is held in the moving image superimposition ratio table 121.

$$x_n = \alpha_n \prod_{i=n+1}^{N} (1 - \alpha_i) \quad (n = 0, \ldots, N-1) \tag{401}$$

$$x_N = \alpha_N \tag{402}$$

Where, if the image data $I_k$ is a still image, $x_k = 0$.

Formulae 401 and 402 above are numerical formulae illustrating an example of the results of the moving image superimposition ratio. Here, $x_k$ is the moving image superimposition ratio of the image data $I_k$. In the moving image superimposition ratio 802, the entry column is created only for moving images. Thus, for the still image $I_k$, $x_k$ is set to 0 for convenience.

Returning to FIG. 5, in step S513, the composition unit 150 outputs the composite image data based on the color value data 602 held in the still image-drawing result table 140, and displays the composite image data on the display 210.

The processes in steps S514 to S517 are repeated for the number of moving image-drawing commands obtained by the division in step S502. Since the only moving image in the example shown in FIG. 3 is the image data 303, the number of repetitions is 1.

In step S515, the composition unit 150 selects one processed moving image output by the moving image-drawing unit 130.

In step S516, the composition unit 150 displays the selected processed moving image so as to be superimposed on the composite result of still images displayed in step S512. The process will be described later in detail.

The above-described process is realized by performing the loop consisting of steps S514 to S517. At the end point of this loop, the image data obtained by composing all still images and moving images is displayed on the display 210.

Figure 11:
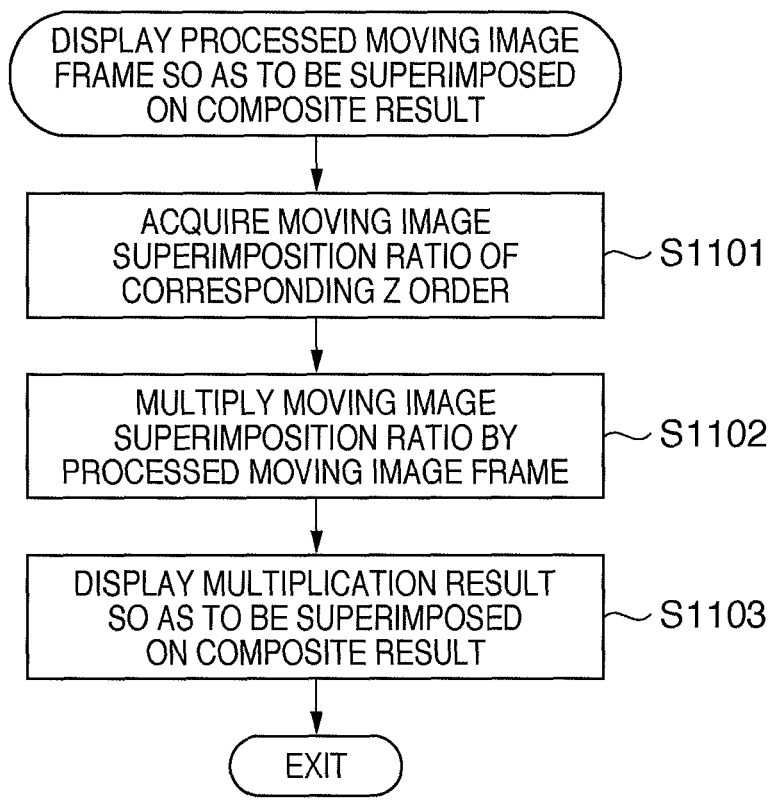
FIG. 11 is a flowchart illustrating an example of a process that displays a moving image in a superimposed manner in an embodiment of the present invention.

Lastly, step S516 shown in FIG. 5 will be described in detail with reference to FIG. 11. FIG. 11 is a flowchart illustrating an example of a process that displays a moving image in a superimposed manner. The process in this flowchart is performed by the CPU 201 executing a computer program written in the ROM 203.

In step S1101, the composition unit 150 acquires the moving image superimposition ratio of a moving image having the same Z order as that output by the moving image-drawing unit 130, from the moving image superimposition ratio table 121.

In step S1102, the composition unit 150 multiplies the color value data of the frame of the selected processed moving image output, by the acquired moving image superimposition ratio.

In step S1103, the composition unit 150 adds the color value data obtained as the result of the multiplication, to the color value data of the composite image data that is currently displayed, and displays the resulting data on the display 210.

With the above-described process, at the end point of the loop consisting of steps S514 to S517, the color value data (R, G, B) as defined by Formulae 501 to 503 below is output on the display 210.

$$R = R_G + \sum_{i=0}^{N} R_i \cdot x_i \tag{501}$$

$$G = G_G + \sum_{i=0}^{N} G_i \cdot x_i \tag{502}$$

$$B = B_G + \sum_{i=0}^{N} B_i \cdot x_i \tag{503}$$

Formulae 501 to 503 are numerical formulae illustrating an example of the color value data output by the composition unit 150. This is the same as the result obtained by composing N+1 images in the Z order in ascending sequence as shown in Formulae 201 to 203. Furthermore, in this embodiment, the order in which the processes in steps S514 to S517 are performed does not depend on the Z order.

With the above-described process, in this embodiment, composition can be performed in the order in which moving image outputs after rendering were processed, without depending on the Z order of the image data. As a result, even in the case where there is a moving image that takes a relatively long time to render, other processed moving image outputs that are to be superimposed after this moving image and on which rendering has already ended can be composed earlier than this moving image. Accordingly, alpha blending at a higher speed can be realized.

Other Embodiments

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-140032, filed May 28, 2008, which is hereby incorporated by reference herein in its entirety.

What is claimed is:

1. An image-processing apparatus that composes pieces of image data that are respectively drawn based on a plurality of drawing commands and displays the composite image data, comprising:

an acquiring unit configured to acquire individual drawing commands in a predetermined order from the plurality of drawing commands;

a determining unit configured to determine whether or not image data that is drawn based on the drawing command is a still image or a moving image, the moving image including a plurality of frames;

a holding unit configured to hold color value data used for displaying a composite result of the still images, and to hold a moving image superimposition ratio used for displaying the moving image for each moving image;

an updating unit configured to update the color value data and the moving image superimposition ratio held by the holding unit; and a display unit configured to display color value data representing composite image data, on a display screen;

wherein, for each piece of image data that is drawn based on the drawing command in the predetermined order, the updating unit:

updates each moving image superimposition ratio held in the holding unit based on a transmittance of the image data;

updates the color value data held by the holding unit based on color value data and a transmittance of a still image in a case where the image data that is drawn based on the drawing command in the predetermined order is determined to be a still image; and updates the color value data held by the holding unit based on a transmittance of a moving image, and causes the transmittance of the moving image to be further held by the holding unit as a moving image superimposition ratio of the moving image in a case where the image data that is drawn based on the drawing command in the predetermined order is determined to be a moving image; and the display unit:

displays the color value data held by the holding unit; and adds color value data, calculated by multiplying the color value data for each frame in the moving image by the moving image superimposition ratio corresponding to the moving image held by the holding unit, to color value data that is currently displayed, and displays resulting data on the display screen.

2. The apparatus according to claim 1, wherein the predetermined order is an order in which pieces of image data are arranged from the rearmost side to the frontmost side on the display screen of the display unit.

3. The apparatus according to claim 1, wherein the predetermined order is an order in which drawing commands are created in the plurality of drawing commands.

4. A non-transitory computer-readable storage medium storing a computer program for causing a computer to function as the image-processing apparatus according to claim 1.

5. A method for controlling an image-processing apparatus that composes pieces of image data that are respectively drawn based on a plurality of drawing commands and displays the composite image data, comprising:

acquiring individual drawing commands in a predetermined order from the plurality of drawing commands;

determining whether or not image data that is drawn based on the drawing command is a still image or a moving image, the moving image including a plurality of frames;

holding color value data used for displaying a composite result of the still image, and holding a moving image superimposition ratio used for displaying the moving image for each moving image;

updating the color value data and the moving image superimposition ratio held in the holding; and displaying color value data representing composite image data, on a display screen;

wherein, for each piece of image data that is drawn based on the drawing command in the predetermined order, at the updating, each moving image superimposition ratio held in the holding is updated based on a transmittance of the image data, the color value data held in the holding is updated based on color value data and a transmittance of a still image in a case where the image data that is drawn based on the drawing command in the predetermined order is determined to be a still image, the color value data held in the holding is updated based on a transmittance of a moving image and the transmittance of the moving image is further held in the holding as a moving image superimposition ratio of the moving image in a case where the image data that is drawn based on the drawing command in the predetermined order is determined to be a moving image, and at the displaying, the color value data held in the holding is displayed, and color value data, calculated by multiplying the color value data for each frame in the moving image by the moving image superimposition ratio corresponding to the moving image held in the holding, is added to color value data that is currently displayed, and resulting data is displayed on the display screen.

* * * * *